Patented Oct. 27, 1953

2,657,171

UNITED STATES PATENT OFFICE 2,657,171

STORAGE- AND AUTOCLAVE-STABLE CONCENTRATED DIHYDROSTREPTOMYCIN SOLUTION

Thomas J. Macek, Irvington, and Edward J. Hanus, Bayonne, N. J., assignors to Merck & Co., Inc., Rahway, N. J., a corporation of New Jersey No Drawing. Application May 10, 1950,
Serial No. 161,254

6 Claims. (Cl. 167—65)

This invention is concerned generally with stabilized aqueous solutions of dihydrostreptomycin. More particularly, it relates to aqueous solutions containing dihydrostreptomycin salts, said solutions being rendered stable against discoloration and deterioration by the addition thereto of both buffering and stabilizing agents.

It has previously been considered impracticable to prepare aqueous solutions containing salts of dihydrostreptomycin for long-term storage because of the instability of the dihydrostreptomycin component. For example, sterile aqueous solutions of dihydrostreptomycin sulfate containing the equivalent of 0.5 gm. of dihydrostreptomycin base per ml., although clear and free of color when first prepared, rapidly discolor and precipitate during storage. This occurs most rapidly at elevated storage temperatures, such as 40° C., or during the process of sterilizing the solutions by autoclaving. It also occurs during storage at ordinary room temperature (25° C.). When aqueous solutions of dihydrostreptomycin sulfate containing the equivalent of 0.5 gm. of dihydrostreptomycin base per ml. are heated at 120° C. for 30 minutes in an autoclave (15 lbs. steam pressure) the solutions become black in color and deposit a heavy black precipitate. Similar decomposition also takes place during storage of aqueous solutions of dihydrostreptomycin sulfate at 40° C. (i. e. summer temperatures) for as short a period as 10 days. Such decomposition, of course, renders these prior art aqueous solutions of dihydrostreptomycin worthless for parenteral or other uses. In addition to the intense discoloration and precipitation noted above, we have found that there is likewise a decrease in the pH and the antibiotic potency of the solutions.

In view of the instability of the aqueous solutions of salts of dihydrostreptomycin, this antibiotic has heretofore been supplied for medical use in the form of a sterile, dry solid and usually as dihydrostreptomycin sulfate. Aqueous solutions, suitable for therapeutic administration, have always been prepared from this solid immediately prior to use. Not only is the extemporaneous preparation of these solutions by the physician or nurse inconvenient, but is also attended by the ever-present hazard of contaminating the solutions. Furthermore, the manufacture of a sterile, dry solid, as contrasted with the preparation of a sterile aqueous solution, is likewise inconvenient and costly. For example, an aqueous solution can be prepared and subdivided on a non-sterile basis and can then be sterilized in the final sealed container. Such measures have, however, never been found to be practicable for the preparation of many sterile solids including dihydrostreptomycin sulfate where aseptic processing has always been exacting and expensive.

It was therefore an object of the present invention to prepare aqueous solutions of dihydrostreptomycin which would not deteriorate, discolor or lose antibiotic activity on exposure to heat so that the solutions might be sterilized by autoclaving. Such solutions would thus be adapted for subdivision on a non-sterile basis, the sterilization being accomplished if desired in the final sealed container.

A further object of the invention was to prepare aqueous solutions of dihydrostreptomycin which would not discolor or precipitate during storage, and which would retain their antibiotic potency even on prolonged storage at room temperature or even at summer temperature (i. e. at 40° C.).

It has now been found that aqueous solutions of dihydrostreptomycin, which are stable both during storage and at the elevated temperatures utilized in sterilization of said solutions, can be prepared by incorporating in said aqueous solutions of dihydrostreptomycin, a buffering agent and a stabilizing agent. Various buffering agents may be utilized as, for example, citrate, phosphate, acetate, and the like. The selection of the stabilizing agent is critical, and we have found it necessary to employ stabilizing agents selected from the class consisting of salts of sulfurous acid, salts of hydrosulfurous acid, and aldehyde addition products thereof, such as sodium bisulfite, sodium formaldehyde sulfoxylate, potassium metabisulfite, sodium hydrosulfite, and the like. We have found that compounds such as monothioglycerol, cysteine hydrochloride, and ascorbic acid (which might possibly have been expected to exert a stabilizing effect) are inoperative for stabilizing aqueous solutions of dihydrostreptomycin.

We ordinarily prefer to utilize a sufficient quantity of buffering agent to adjust the pH of the dihydrostreptomycin solution within the range of 5.0 to 8.0. We have found that aqueous solutions of dihydrostreptomycin containing a buffering agent, even in the absence of a stabilizing agent, show greatly increased stability as compared with dihydrostreptomycin solutions containing no buffer. For example, aqueous solutions of dihydrostreptomycin sulfate containing the equivalent of 0.5 g. of dihydrostreptomycin base per ml., when adjusted to a pH of 5.0 to 8.0 by the addition of a buffering agent and subjected to accelerated heating tests, exhibit much less discoloration than do the corresponding unbuffered solutions. In spite of the improvement shown by these dihydrostreptomycin solutions, which contain a buffer but no stabilizing agent, there is an objectionable discoloration of the solution on heating and storage sufficient to render such solutions unsatisfactory for therapeutic use. It is likewise possible to impart increased stability to aqueous solutions of dihydrostreptomycin by incorporating therein a stabilizing agent, and no buffering agent. Such solutions upon heating or storage also exhibit an objectionable discoloration.

We have discovered, however, that when there is incorporated in an aqueous solution of dihydrostreptomycin both a buffering agent and one or more of the stabilizing agents of the class enumerated hereinabove, that the resulting solutions of dihydrostreptomycin exhibit substantially no discoloration during sterilization by autoclaving at 120° C or during accelerated heating tests. For example, aqueous solutions of dihydrostreptomycin containing both a buffering agent and at least one stabilizing agent can be heated at 120° C. for 30 minutes, or stored for prolonged periods at lower temperatures, without objectionable discoloration or other evidence of instability.

It is a preferred embodiment of the present invention that, instead of adding a buffer salt to an aqueous solution containing dihydrostreptomycin sulfate, said aqueous solutions can be prepared employing, in place of the mixture of dihydrostreptomycin and a buffer salt, a salt of dihydrostreptomycin with citric acid. It has been found that such a dihydrostreptomycin salt, when prepared in the pH range of 5.0 to 8.0 likewise functions as a buffer, having a capacity of reacting either with hydroxyl or hydrogen ions formed during heating or decomposition processes. For example, aqueous solutions of dihydrostreptomycin citrate having a pH within the range of 5.0 to 8.0 and containing a small amount of at least one stabilizing agent selected from the group previously enumerated hereinabove, were found to be stable during accelerated stability tests conducted at temperatures of 120° C. for periods up to 2 hours, and at lower temperatures for more prolonged periods of time. Such solutions possess the additional advantage of being less hypertonic than solutions of other salts of dihydrostreptomycin containing added buffer salts and thus result in less pain on injection. Thus, dihydrostreptomycin citrate can be used to produce aqueous solutions of the antibiotic which exhibit much less discoloration during the accelerated tests than the corresponding aqueous solutions of other salts of dihydrostreptomycin such as the sulfate or hydrochloride. Aqueous solutions of dihydrostreptomycin citrate containing one or more stabilizing agents of the group enumerated hereinabove can be used to produce highly stable aqueous solutions of the antibiotic. These solutions can be sterilized by autoclaving without appreciable decomposition of the antibiotic, or discoloration of the solutions, to produce sterile solutions useful for parenteral or other therapeutic administration. This superiority of dihydrostreptomycin citrate over other solutions of dihydrostreptomycin (such as the sulfate or hydrochloride) for the preparation of stabilized parenteral solutions, was indeed surprising.

The following examples illustrate methods of carrying out the present invention, but it is to be understood that these examples are given for purposes of illustration and not of limitation.

EXAMPLE 1

|  | Grams |
|---|---|
| Dihydrostreptomycin sulfate, crystalline | 65.0 |
| Sodium bisulfite | 0.5 |
| Citrate buffer solution (pH 5.0) to make 100.0 cc. | |

Each cc. of the solution contains 650 mg. of dihydrostreptomycin sulfate equivalent to 500 mg. of dihydrostreptomycin base. The solution is prepared by dissolving the sodium bisulfite and the dihydrostreptomycin sulfate in the citrate buffer solution. The solution can be sterilized either by aseptic filtration or can be subdivided into suitable ampuls or vials and sterilized by autoclaving at 120° C. for 30 minutes. Solutions prepared in this manner have been heated at 120° C. for 1 hour and at 100° C. for as long as 6 hours without any significant discoloration, development of black precipitates, or other indications of instability.

In the above example, the sodium bisulfite has been replaced with equal amounts of sodium formaldehyde sulfoxylate, potassium metabisulfite, or sodium hydrosulfite, as the stabilizing agent, without alteration in the results.

In the above example, the citrate buffer solution was 0.5 M in concentration and was prepared as follows:

A. *0.5 M monosodium citrate solution*

| | | |
|---|---|---|
| Citric acid U. S. P. ($H_3C_6H_5O_7 \cdot H_2O$) | gm | 105.0 |
| 1 N sodium hydroxide solution | cc | 500.0 |
| Distilled water to make 1000.0 cc. | | |

B. *0.5 M trisodium citrate solution*

|  | Grams |
|---|---|
| Sodium citrate U. S. P. ($Na_3C_6H_5O_7 \cdot 2H_2O$) | 147.0 |
| Distilled water to make 1000.0 cc. | |

Equal parts of solutions A and B were mixed and adjusted to exactly pH 5.0 by the addition, in portions, of either component.

In the above example, the citrate buffer solution has been replaced by 0.5 M phosphate buffer solution and by 0.5 M acetate buffer solution with equal results.

EXAMPLE 2

| | | |
|---|---|---|
| Dihydrostreptomycin sulfate, crystalline | gm | 65.0 |
| Sodium bisulfite | gm | 0.5 |
| 5 N sodium hydroxide solution (sufficient to adjust to pH 6.8–7.2) | cc | Approx. 1 |
| Sodium citrate U. S. P. ($Na_3C_6H_5O_7 \cdot 2H_2O$) | gm | 2.94 |
| Distilled water to make 100.0 cc. | | |

Each cc. of the solution contains 650 mg. of dihydrostreptomycin sulfate equivalent to 500 mg. of dihydrostreptomycin base. The solution is prepared by dissolving the sodium bisulfite, dihydrostreptomycin sulfate and the sodium citrate in the distilled water, and enough 5 N sodium hydroxide solution is added dropwise to adjust the pH to the range of 6.8 to 7.2. The solution can be sterilized either by aseptic filtration or can be subdivided into suitable ampuls or vials and sterilized by autoclaving at 120° C. for 30 minutes. Solutions prepared in this manner have been heated at 120° C. for 1 hour and at 100° C. for as long as 6 hours without significant discoloration, development of black precipitate, or other indication of instability.

In the above example, the sodium bisulfite can be replaced with equal amounts of sodium formaldehyde sulfoxylate, potassium metabisulfite, or sodium hydrosulfite, as the stabilizing agent, without alteration in results. The pH may also be varied by the addition of more sodium hydroxide to the range 7.5 to 8.0 without alteration in results.

EXAMPLE 3

To a solution of 146 gm. (0.1 molar) dihydrostreptomycin sulfate in 450 ml. water, cooled in ice water, is added 105 g. (excess) barium hydroxide in 250 ml. of hot water. The excess barium hydroxide is removed by adding pieces of Dry Ice The solution is filtered with "Celite" (diatomaceous silica) and the solution of dihydrostreptomycin base is neutralized to pH 6.3 by the addition of citric acid (37 gm. citric acid monohydrate was required). The aqueous solution is treated with activated charcoal and filtered to produce a substantially neutral solution of dihydrostreptomycin citrate. Lyophilization of this solution produces solid crystalline dihydrostreptomycin citrate.

EXAMPLE 4

| | Grams |
|---|---|
| Dihydrostreptomycin citrate (pH 5.0–5.5) | 37.5 |
| Sodium bisulfite | 0.5 |
| Distilled water to make 100.0 cc. | |

Each cc. of the solution is equivalent to approximately 250 mg. of dihydrostreptomycin base. The solution is prepared by dissolving, in the distilled water, the sodium bisulfite and the dihydrostreptomycin citrate (previously prepared by neutralizing dihydrostreptomycin base with citric acid to a pH range 5.0 to 5.5 and isolating the solid). The solution can be sterilized either by aseptic filtration or can be subdivided into suitable ampuls or vials and sterilized by autoclaving at 120° C. for 30 minutes. Solutions prepared in this manner have been heated at 120° C. and at 100° C. for several hours without significant discoloration, change in pH, precipitation or other indications of instability.

In the above example, the concentration of dihydrostreptomycin citrate may be varied without change in results. Thus, solutions containing the equivalent of 500 mg. of dihydrostreptomycin base per ml. have been similarly prepared. Furthermore, the dihydrostreptomycin citrate may be itself varied to give a pH range other than 5.0–5.5, as for example, the pH range 6.5 to 7.0, without alteration in results.

EXAMPLE 5

| | Grams |
|---|---|
| Crystalline dihydrostreptomycin sulfate | 65.00 |
| Trisodium citrate U. S. P. | 1.47 |
| Sodium bisulfite | 0.20 |
| Sodium formaldehyde sulfoxylate | 0.50 |
| 5 N sodium hydroxide solution a sufficient quantity to adjust to pH 7.4 | |
| Distilled water, to make 100.00 cc. | |

The sodium formaldehyde sulfoxylate and sodium bisulfite are dissolved in a portion of the water, to which the trisodium citrate and the dihydrostreptomycin sulfate, added in portions with stirring, are added. The sodium hydroxide solution is added to adjust the pH of the solution to 7.4 and enough distilled water is then added to make the final volume. The solution, each cc. of which contains the equivalent of 500 mg. of dihydrostreptomycin base, is then clarified (of fibers, particles, etc.) by filtration and is subdivided into ampuls or vials, and sterilized by autoclaving at 121° C. for 20 minutes. No significant discoloration, change in pH, loss in potency or other evidence of decomposition occurs during such treatment. This solution can also be prepared on an aseptic basis by dissolving sterile dihydrostreptomycin sulfate in a sterilized aqueous vehicle containing all other components.

Various changes and modifications may be made in carrying out the present invention without departing from the spirit and scope thereof. Insofar as these changes and modifications are within the purview of the annexed claims, they are to be considered as part of our invention.

We claim:

1. A stable concentrated aqueous solution of dihydrostreptomycin, characterized as being stable both during storage and at the elevated temperatures utilized for sterilization by autoclaving, which comprises an aqueous solution containing a salt of dihydrostreptomycin, the amount of said salt being equivalent to at least about 250 mg. of dihydrostreptomycin base per cc. of solution, a buffering agent, and at least one stabilizing agent selected from the group consisting of salts of sulfurous acid, salts of hydrosulfurous acid, and aldehyde addition products thereof, the amount of said buffering agent being sufficient to adjust the pH of the solution within the range of 5.0 to 8.0.

2. A stable concentrated aqueous solution of dihydrostreptomycin, characterized as being stable both during storage and at the elevated temperatures utilized for sterilization by autoclaving, which comprises an aqueous solution containing a salt of dihydrostreptomycin, the amount of said salt being equivalent to approximately 250 to 500 mg. of dihydrostreptomycin base per cc. of solution, a buffering agent and sodium formaldehyde sulfoxylate, the amount of said buffering agent being sufficient to adjust the pH of the solution within the range of 5.0 to 8.0.

3. A stable concentrated aqueous solution of dihydrostreptomycin, characterized as being stable both during storage and at the elevated temperatures utilized for sterilization by autoclaving, which comprises an aqueous solution containing a salt of dihydrostreptomycin, the amount of said salt being equivalent to approximately 250 to 500 mg. of dihydrostreptomycin base per cc. of solution, a buffering agent and sodium bisulfite, the amount of said buffering agent being sufficient to adjust the pH of the solution within the range of 5.0 to 8.0.

4. A stable concentrated aqueous solution of dihydrostreptomycin, characterized as being stable both during storage and at the elevated temperatures utilized for sterilization by autoclaving, which comprises an aqueous solution containing a salt of dihydrostreptomycin, the amount of said salt being equivalent to approximately 250 to 500 mg. of dihydrostreptomycin base per cc. of solution, a buffering agent, sodium bisulfite and sodium formaldehyde sulfoxylate, the amount of said buffering agent being sufficient to adjust the pH of the solution within the range of 5.0 to 8.0.

5. A stable concentrated aqueous solution of dihydrostreptomycin, characterized as being stable both during storage and at the elevated temperatures utilized for sterilization by autoclaving, which comprises an aqueous solution, having a pH of 5.0 to 8.0, and containing an amount of dihydrostreptomycin citrate equivalent to approximately 500 mg. of dihydrostreptomycin base per cc. of solution and sodium bisulfite.

6. A stable concentrated aqueous solution of dihydrostreptomycin, characterized as being stable both during storage and at the elevated temperatures utilized for sterilization by autoclaving, which comprises an aqueous solution having a pH of 7.4, and containing an amount of dihydrostreptomycin citrate equivalent to approximately 500 mg. of dihydrostreptomycin base per cc. of solution, sodium bisulfite, and sodium formaldehyde sulfoxylate.

THOMAS J. MACEK.
EDWARD J. HANUS.

References Cited in the file of this patent

UNITED STATES PATENTS

| Number | Name | Date |
|---|---|---|
| 2,473,339 | Kirchmeyer et al. | June 14, 1949 |
| 2,498,574 | Peck | Feb. 21, 1950 |
| 2,501,014 | Wintersteiner et al. | Mar. 21, 1950 |